US007748169B2

(12) United States Patent
    Côté

(10) Patent No.: US 7,748,169 B2
(45) Date of Patent: Jul. 6, 2010

(54) INSULATING PANEL

(76) Inventor: Éric Côté, 112, des Allonges, Saint-Pie, Quebec (CA) J0H 1W0

( * ) Notice: Subject to any disclaimer, the term of this patent is extended or adjusted under 35 U.S.C. 154(b) by 944 days.

(21) Appl. No.: 11/526,654

(22) Filed: Sep. 26, 2006

(65) Prior Publication Data
    US 2007/0068103 A1    Mar. 29, 2007

(30) Foreign Application Priority Data
    Sep. 29, 2005    (GB)    ................... 0519791.8

(51) Int. Cl.
    *E04B 1/34*    (2006.01)
(52) U.S. Cl. .............. 52/2.11; 52/406.1; 52/404.1; 454/334
(58) Field of Classification Search ............ 52/2.11, 52/406.1, 404.1; 428/69, 76; 454/254, 334
    See application file for complete search history.

(56) References Cited
    U.S. PATENT DOCUMENTS
    3,359,687 A * 12/1967 Wallace ............ 49/477.1
    4,346,132 A * 8/1982 Cheng et al. ............ 428/76
    4,672,888 A * 6/1987 Crombie et al. ............ 454/254
    7,094,144 B2 * 8/2006 Dube ............ 454/334

* cited by examiner

*Primary Examiner*—David Dunn
    *Assistant Examiner*—Daniel Kenny

(57) ABSTRACT

An insulating panel attachable to a building, the building defining a building aperture, the building aperture defining an aperture plane extending substantially thereacross. The insulating panel includes a membrane structure defining a first external wall and a substantially opposed second external wall; a peripheral wall extending between the first and second external walls, the first external wall, second external wall and peripheral wall together defining an enclosure; and an internal wall system located between the first and second external walls, the internal wall system being configured so as to divide the enclosure into a first cell located substantially adjacent to the first external wall and a second cell located substantially adjacent to the second external wall, the first and second cells being substantially spaced apart respectively from the second and first external walls by the internal wall system. A frame is attachable to the building, the frame being operatively coupled to the membrane structure for maintaining the first external wall substantially parallel to the aperture plane and substantially in register with at least a portion of the building aperture when the frame is attached to the building.

15 Claims, 6 Drawing Sheets

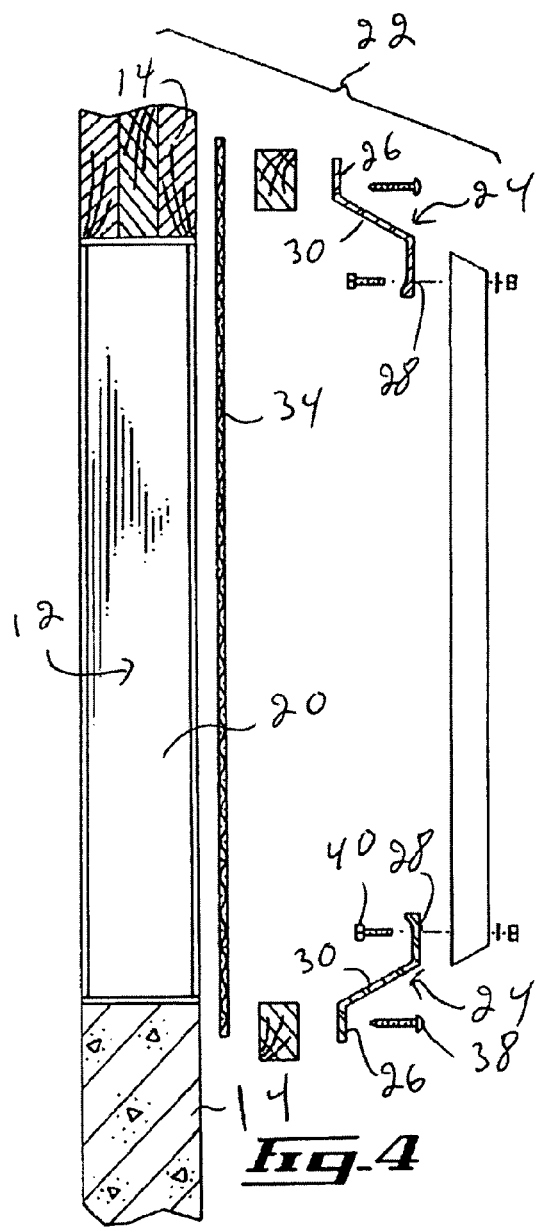
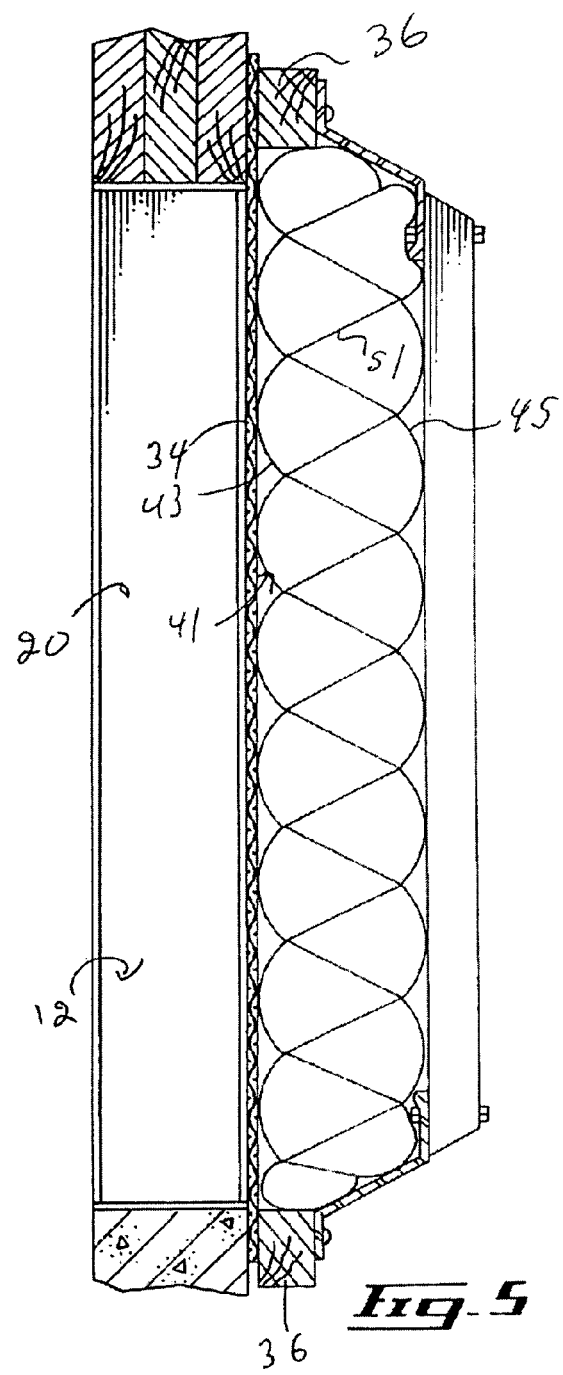

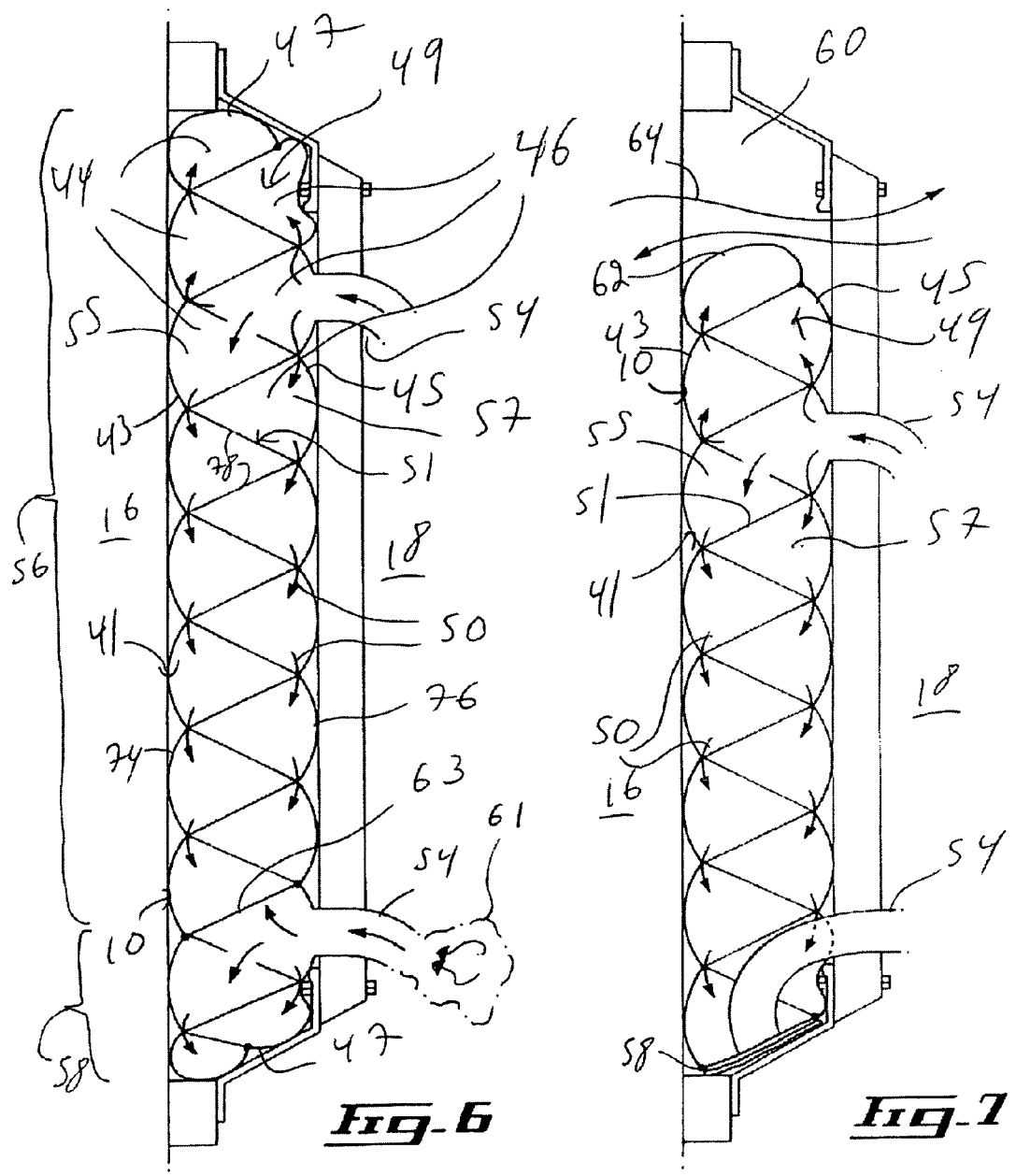

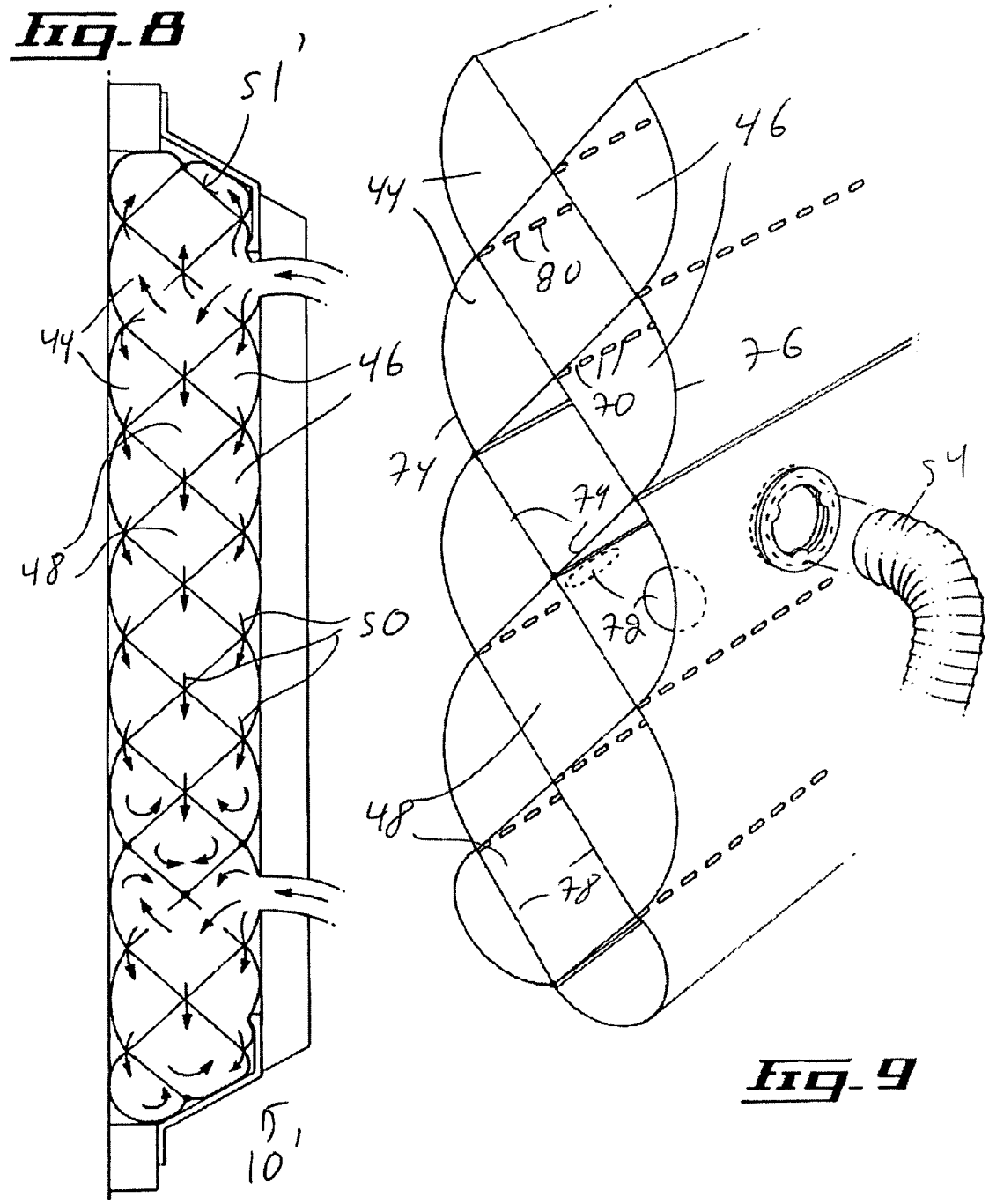

INSULATING PANEL

FIELD OF THE INVENTION

The present invention relates generally to the field of building insulation is particularly concerned with an insulating panel.

BACKGROUND OF THE INVENTION

With the advent of possible energy shortages and the ever-increasing costs of energy along with major concerns about the environment, there has been a concurrent renewed interest in energy conservation technology. A particular area or field where energy is often managed less than satisfactorily is that of heat gains and losses in both commercial and residential buildings through poorly insulated wall areas such as windows and the like.

One of the basic tenants of conventional solar energy saving principles for buildings is that substantially large and south-facing windows can be used to gain heat during sunny winter days. However, these relatively large windows are also unfortunately responsible for heat loss during cold winter nights and days due to re-radiation of the heat from the interior of the building through the windows to the colder air. On the other hand, during hot summer days, it is desirable to keep the heat from the sunlight during the day out of the interior or the house and to allow the heat in the house to radiate to the outside during the night. Therefore, in order to take optimum advantage of the heating and cooling cycles of the sun or absence thereof during day and night periods, it is often necessary to be able to move insulation in place over the windows or to retract it at appropriate times throughout the transfer of heat therethrough or to prohibit the transfer of heat therethrough as desired. This need for movable insulation panels exists not only for windows but also in a variety of other settings such as in apertures formed in partition walls, doors and other contexts.

This need for a movable insulation panel has resulted in a renewed interest in the use of so-called cellular window coverings since such structures contain numerous individual dead air space cells and are readily expandable and contractible. Such cellular window coverings are well known in the art. Typically, conventional cellular shading products are made using a flat material referred to as a web. The web is folded and/or stacked into some form, then bound along lines or seams and converted to a cellular, collapsible sheet. One type of cellular window covering is made from two flat sheets of material, which are pleated and then glued face to face at the apex of the folds to form the cells. Although somewhat useful, conventional cellular window coverings structures however suffer from numerous drawbacks.

For example, since only a single layer of cells is used, opposed sides of the cells are directly in contact with the temperature extremes which the window covering tends to insulate and hence, heat transfer through the cells is still substantial.

Also, because of the inherent construction of prior art cellular insulating panels, should a leak occur in any of the cells, the leak would compromise the efficiency of the panel altogether and potentially lead to its breakdown.

Furthermore, because of their inherent construction, these prior art cellular insulating panels are not well adapted to being only deflated in a predetermined region thereof so as to allow selective retraction of a portion thereof.

Accordingly, there exists a need for an improved insulating panel opening. It is a general object of the present invention to provide such an improved insulating panel.

SUMMARY OF THE INVENTION

In a first broad aspect, the invention provides an insulating panel attachable to a building, the building defining a building aperture, the building aperture defining an aperture plane extending substantially thereacross. The insulating panel includes:

a membrane structure defining
 a first external wall and a substantially opposed second external wall;
 a peripheral wall extending between the first and second external walls, the first external wall, second external wall and peripheral wall together defining an enclosure; and
an internal wall system located between the first and second external walls, the internal wall system being configured so as to divide the enclosure into a first cell located substantially adjacent to the first external wall and a second cell located substantially adjacent to the second external wall, the first and second cells being substantially spaced apart respectively from the second and first external walls by the internal wall system; and
a frame attachable to the building, the frame being operatively coupled to the membrane structure for maintaining the first external wall substantially parallel to the aperture plane and substantially in register with at least a portion of the building aperture when the frame is attached to the building.

Advantages of the present invention include that the proposed insulating panel is provided with at least two juxtaposed layers of cells extending transversely between the two environments between which the panel is located and which the panel attempts to thermally insulate. Hence, the thermal insulating capacity of the panel is increased to that of structures using a single layer of cells since both conduction and convective heat transfer modes are potentially reduced.

Also, in some embodiments of the invention, at least a portion of the material separating the two juxtaposed layers of cells is substantially infrared radiation reflective, which adds to the synergy of conduction and convection losses reduction by reducing radiation heat losses.

Furthermore, the proposed insulating panel is designed so that, should one or more of its cells be punctured, the panel is able to maintain its external structural integrity and, hence, remains able to extend across the opening it attempts to thermally insulate.

Yet, still furthermore, the proposed insulating panel is designed so as to allow, in some embodiments of the invention, an intended user to selectively collapse a predetermined portion of the panel hence selectively allowing partial retraction of the panel from the opening it attempts to thermally insulate.

Yet, still, furthermore, the proposed insulating panel is designed so as to be manufacturable using conventional forms of manufacturing, hence providing an insulating panel that will be economically feasible, long-lasting and relatively trouble-free in operation.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

An embodiment of the present invention will now be disclosed, by way of example, in reference to the following drawings in which:

FIG. 4: in a partial transversal cross-sectional exploded view, illustrates some of the structural components associated with an insulating panel such as shown in FIGS. 1 through 3;

FIG. 5: in a partial transversal cross-sectional view, illustrates the insulating panel shown in FIGS. 1 through 3;

FIG. 6: in a schematic transversal cross-sectional view, illustrates the air flow associated with an insulating panel such as shown in FIG. 5, the panel being shown in its fully extended configuration;

FIG. 7: in a schematic transversal cross-sectional view, illustrates the air flow associated with an insulating panel such as shown in FIG. 5, the panel being shown in a partially retracted configuration;

FIG. 8: in a partial schematic cross-sectional view, illustrates part of the configuration of an insulating panel in accordance with an alternative embodiment of the invention;

FIG. 9: in a partial perspective view with sections taken out, illustrates some of the features of the insulating panel shown in FIG. 8.

DETAILED DESCRIPTION

Figure 1:
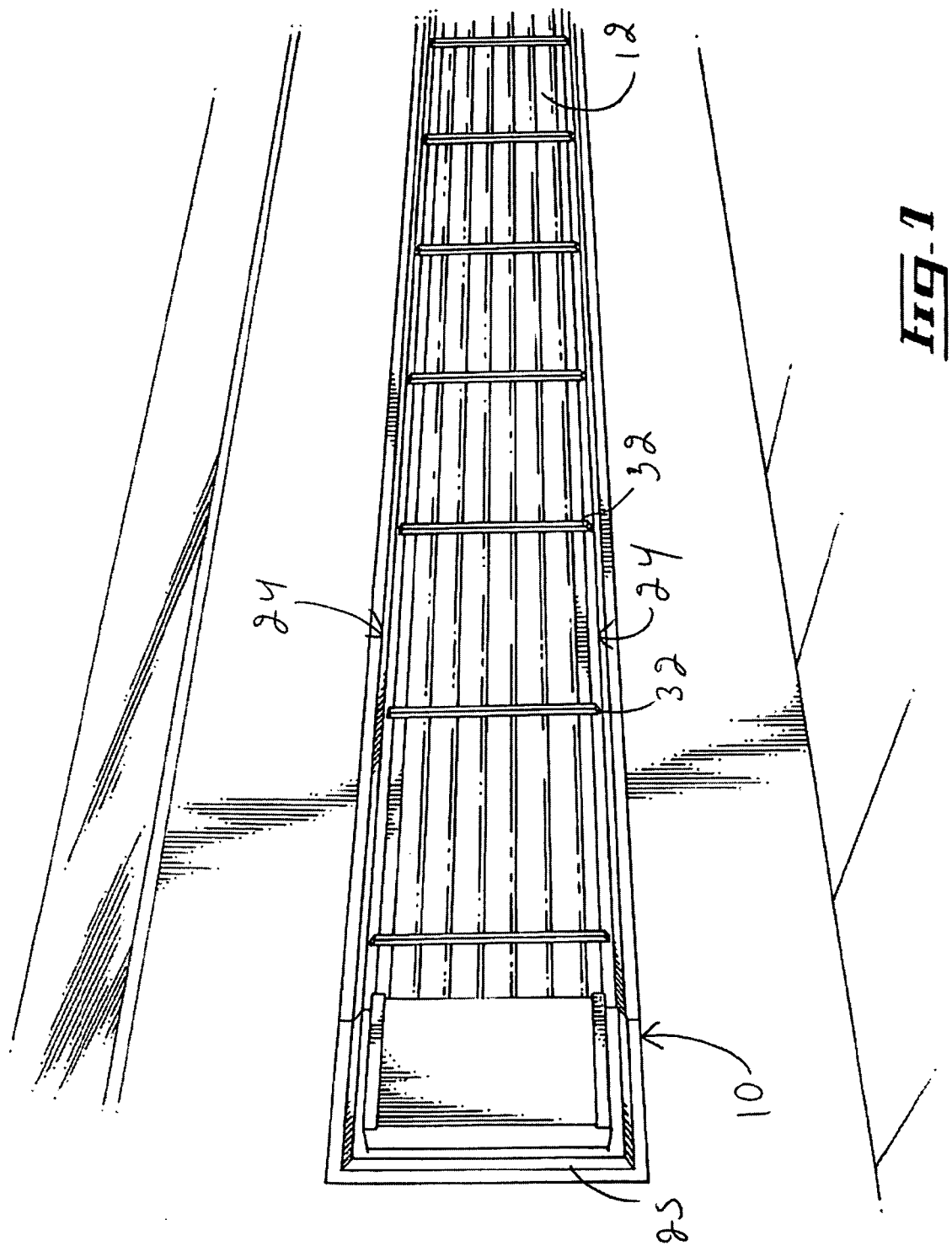
FIG. 1: in a partial perspective view, illustrates an insulating panel in accordance with an embodiment of the present invention, the insulating panel being shown extending across a window aperture in a fully-expanded configuration, the insulating panel being inflatable.

Referring to FIG. 1, there is shown an insulating panel in accordance with an embodiment of the present invention, generally indicated by the reference numeral 10. The insulating panel 10 is shown extending across a window aperture 12 defining an aperture plane extending substantially thereacross. As shown more specifically in FIG. 2, the window aperture 12 typically extends across a wall 14 such as a partition wall partitioning two rooms part of a building or an exterior wall delimiting the exterior of the building from its interior. It should, however, be understood that the insulating panel 10 could be used in other contexts for extending across other types of apertures of a building, such as for example doors or the like, without departing from the scope of the present invention.

The insulating panel 10 is typically used to thermally insulate two distinct environments. These two distinct environments are schematically referred to in FIG. 2 as a first environment 16 located rearwardly relative to the insulating panel 10 and a second environment 18 located frontwardly or inwardly relative to the insulating panel 10. It should be noted that the insulating panel 10 could be used to insulate the first and second environments 16, 18 against transmission from one environment to the other of parameters other than thermal energies, such as noise, light or the like without departing from the scope of the present invention.

Figure 2:
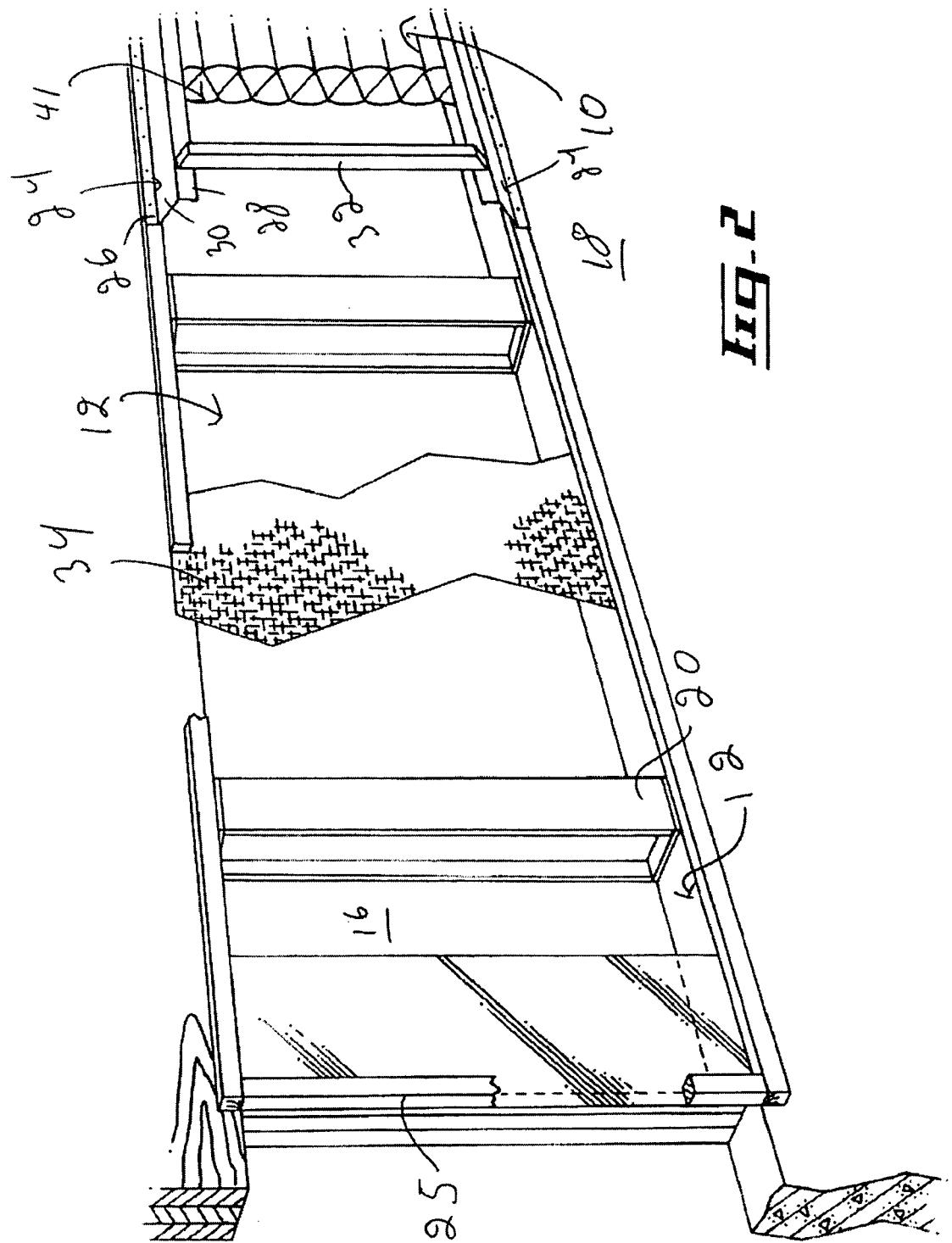
FIG. 2: in a partial perspective view with sections taken out, illustrates some of the structural components associated with the insulating panel shown in FIG. 1.

As shown more specifically in FIGS. 2 and 4, the window aperture 12 is typically delimited or interrupted by columns 20 or other structural components used for maintaining of the building. It should, however, be understood that this is only shown by way of example and that other types of structural arrangements could be used without departing from the scope of the present invention.

As illustrated more specifically in FIG. 4, the insulating panel 10 is typically provided with a frame 22 for maintaining the insulating panel 10 properly mounted within the corresponding window aperture 12. The frame 22 typically includes at least one, and preferably two retaining brackets 24. The retaining brackets 24 are typically secured to the supporting wall 14 substantially adjacent the peripheral edge of the window aperture 12. The retaining brackets 24 are typically configured and sized for abuttingly contacting the upper and lower peripheral edges of the insulating wall 10.

Each retaining bracket 24 typically has a substantially modified Z-shaped cross-sectional configuration. Each retaining bracket 24 typically includes a bracket-to-wall attachment segment 26 for securing the bracket 24 to a portion of a corresponding wall 14. Each retaining bracket 24 also typically includes a bracket distal segment 28 extending in a substantially parallel relationship to the bracket-to-wall attach segment 26 in an outwardly spaced relationship relative thereto. Each retaining bracket 24 typically further includes a bracket intermediate segment 30 extending downwardly and outwardly from the segment 26 towards the bracket distal segment 28. It should, however, be understood that the retaining bracket 24 could have other configurations without departing from the scope of the present invention.

The retaining brackets 24 are part of a frame peripheral body, the frame peripheral body defining a top body section (formed by the top retaining bracket 24), a bottom body section substantially opposed to the top body section (formed by the bottom retaining bracket 24) and two frame lateral sections 25, one of which being shown in FIGS. 1 and 2, substantially opposed to each other extending between the top and bottom body sections.

The frame 22 typically includes at least one, and preferably a plurality of reinforcing members in the form of retaining struts 32 extending substantially vertically between opposed retaining brackets 24. As shown in FIG. 1, the retaining struts 30 are typically spaced relative to each other along the length of the window aperture 12. It should, however, be understood that the retaining struts 32 could have other configurations without departing from the scope of the present invention. Also, other retaining means could extend between retaining brackets 24 without departing from the scope of the present invention. For example, a grid, mesh or the like could extend between the retaining brackets 24 without departing from the scope of the present invention.

In the embodiments shown throughout the Figures, a meshed screen 34 is mounted so as to extend across the window aperture 12 rearwardly or outwardly relative to the insulating wall 10. Again, it should be understood that the meshed screen 34 could be otherwise located or altogether absent without departing from the scope of the present invention. In the embodiments shown throughout the Figures, the meshed screen 34 is secured to the wall 14 using a peripheral frame 36, the meshed screen 24 being sandwiched between the peripheral frame 36 and the wall 14. The peripheral frame 36 is also used for securing the bracket-to-wall attachment segment 26. Typically, fastening components 38 such as conventional screws or the like are adapted to extend through the bracket-to-wall attachment segment 26, the peripheral frame 36, the meshed screen 34 into the wall 14. Conventional fastening means 40, such as a nut and bolt combination or other suitable means may be used for securing the struts 32 to the bracket distal segment 28. It should be understood that any other suitable type of fastening means, including adhesives or the like, could be used without departing from the scope of the present invention.

In addition, while the panel 10 is illustrated as extending substantially entirely on one side of the wall 14 of the building defining the aperture 12, it is within the scope of the invention to have panels that extend in any other relationship relative to the aperture 12. For example, the panel 10 may be located within the aperture 12 without departing from the scope of the invention.

As shown more specifically in FIGS. 6 and 7, the insulating panel 10 includes a membrane structure 41 defining a first external wall 43 and a substantially opposed second external wall 45. A peripheral wall 47 (only part of which is shown in FIGS. 6 and 7 extends between the first and second external walls 43 and 45. The first external wall 43, second external wall 45 and peripheral wall 47 together defining an enclosure 49.

An internal wall system 51 is located between the first and second external walls 43 and 45. The internal wall system is configured so as to divide the enclosure into at least a first cell 55 located substantially adjacent to the first external wall 43 and second cell 57 located substantially adjacent to the second external wall 45. The first and second cells 55 and 57 are substantially spaced apart respectively from the second and first external walls 45 and 43 by the internal wall system 51. The frame 22 is operatively coupled to the membrane structure 41 for maintaining the first external wall 43 substantially parallel to the aperture plane and substantially in register with at least a portion of the window aperture 12 when the frame 22 is attached to the building.

In some embodiments of the invention, the internal wall system 51 is configured so as to divide the enclosure 49 into a first layer of cells including at least two first layer cells 44 and a second layer of cells including at least two second layer cells 46, the first layer cells 44 being located substantially adjacent to the first external wall 43 and the second layer cells 46 being located substantially adjacent to the second external wall 45. The first and second layer cells 44 and 46 are substantially spaced apart respectively from the second and first external walls 45 and 43 by the internal wall system 51. In other words, the first layer cells 44 are adapted to be in contact with the first environment 16 while the second layer cells 46 are adapted to be in contact with the second environment 18. However, in alternative embodiments of the invention, the membrane structure 41 defines only one first layer cell 44 and one second layer cell 46.

In the embodiment of the invention shown in the drawings, the aperture plane is substantially vertical and the first and second layer cells 44 and 46 are each substantially horizontally substantially elongated. However, in alternative embodiments of the invention, the first and second layer cells 44 and 46 take any other suitable configuration.

By providing individual first and second layer cells 44 and 46 disposed so as to form independent, yet juxtaposed, layers, each of which in contact with only one of the first and second environments, the insulating capacity of the insulating panel 10 is improved compared to a structure wherein the cells form a unique column in contact with both environments 16, 18. Indeed, this configuration substantially reduces heat conduction and convection across the insulating panel 10 between the environments 16, 18.

Furthermore, the use of at least two independent layers of cells 44 and 46 improves the overall structural integrity and reliability of the insulating panel 10. Furthermore, should one of the first or second layer cells 44 and 46 become deficient or be punctured, the capacity of the insulating panel 10 to span across the window aperture 12 is preserved by the structure characteristics of the other layer of cells 44 and 46.

In some embodiments of the invention, at least some of the first and second layer cells 44 and 46 are substantially tapered in a direction leading substantially away respectively from the first and second external walls 43 and 45. This tapered configuration further reduces convective heat transfer as it impedes the progression of convection currents in a direction leading substantially away from the environments 16 and 18. In specific embodiments of the invention, the first and second layer cells 44 and 46 taper to a point.

In some embodiments of the invention, the internal wall system 51 includes a substantially zigzag shaped portion extending between the first and second structure external walls 43 and 45. For example, the internal wall system takes the form of a substantially zigzag shaped wall. This zigzag shape of the internal wall system 51 results in the substantially tapered configuration of the first and second layer cells 44 and 46. Also, this internal wall system 51 configuration results in the first and second layers of cells to be substantially staggered relatively to each other.

In some embodiments of the invention, at least a portion of the internal wall system 51 is substantially reflective to infrared radiation. In these embodiments, radiative heat transfer between the two environments 16 and 18 is substantially reduced by this infrared radiation reflectivity.

FIGS. 6 and 7 illustrate a situation wherein the first and second layer cells 44 and 46 form two juxtaposed columns 44 and 46. FIGS. 8 and 9 illustrate an alternative insulating panel 10' wherein the insulating panel 10 includes three distinct, yet juxtaposed, columns. In other words, in the embodiment of the invention shown in FIGS. 8 and 9, The first and second layer cells 44 and 46 are in contact respectively with the first and second environments 16 and 18 while a third layer of cells 48 is located intermediate the first and second layer cells 44, 46, and therefore extend between the first and second layer cells 44, 46. Due to the configuration of the internal wall system 51', wherein the first and second layers of cells 44 and 46 are substantially staggered relatively to the third layer of cells 48.

It should be understood that the insulating panel 10 shown in the Figures are only shown by way of example and that numerous other cell configurations could be used without departing from the scope of the present invention. For example, the insulating panel 10 could includes any suitable number of juxtaposed layers without departing from the scope of the present invention as long as the insulating panel 10 incorporates at least two juxtaposed layer 44, 46 respectively in contact at least in part with the first and second environments 16, 18. In an alternative embodiment of the invention (not shown), the layers could zigzag transversely across the panel 10 so as to be alternatively in contact with the first and second environments 16, 18.

As indicated by arrows 50 in FIGS. 6, 7 and 8, the pressurized air emanating from a suitable pressurized air source 61 only schematically represented in FIG. 6 is adapted to flow between cells 44, 46 or 48 forming a given layer so as to have selective inflation of the corresponding layer. As indicated also by arrows 50, the pressurized air is also adapted to flow selectively between layers at predetermined locations so as to allow inflation of a predetermined number of layers using a single inlet duct 54.

Advantageously, in some embodiments of the invention, the insulating panel 10 is divided into groups of cells separated from each other by substantially fluid impervious wall sections of the internal wall system 51, the substantially fluid impervious wall sections substantially preventing an exchange of fluid between the groups of cells. For example, a partition wall 63 divides the insulating panel 10 into at least two independent wall sections that are adapted to be independently inflated or deflated using corresponding independent air inlet/outlet ducts 54.

In the embodiments shown in FIGS. 6 through 9, the insulating panel 10 includes a first or upper panel section 56 including a first group of cells and a second or lower panel section 58 including a second group of cells (both better seen in FIG. 6). It should be understood that the panel 10 could be otherwise divided using any suitable number of panel sections without departing from the scope of the present invention. Also, in the embodiments shown in FIGS. 6 through 9, the upper or first panel section 56 is considerably larger than the second or lower panel section 58. Again, it should be understood that the configuration and size of the panel sections could be otherwise without departing from the scope of the present invention.

FIG. 6 illustrates a situation wherein both the first and second panel sections 56, 58 are fully inflated. Accordingly, the insulation panel 10 spans across the entirety of the window aperture 12. Conversely, FIG. 7 illustrates a situation wherein the second or lower panel section 58 is deflated. Only the upper panel section 56 is inflated. Accordingly, a frame-to-panel spacing 60 is created between the peripheral frame 36 or other peripheral structure of the wall 14 and the upper peripheral edge 62 of the insulating panel 10. The spacing 60 allows for the flow of air 64 between the first and second environments 16, 18.

Figure 3:
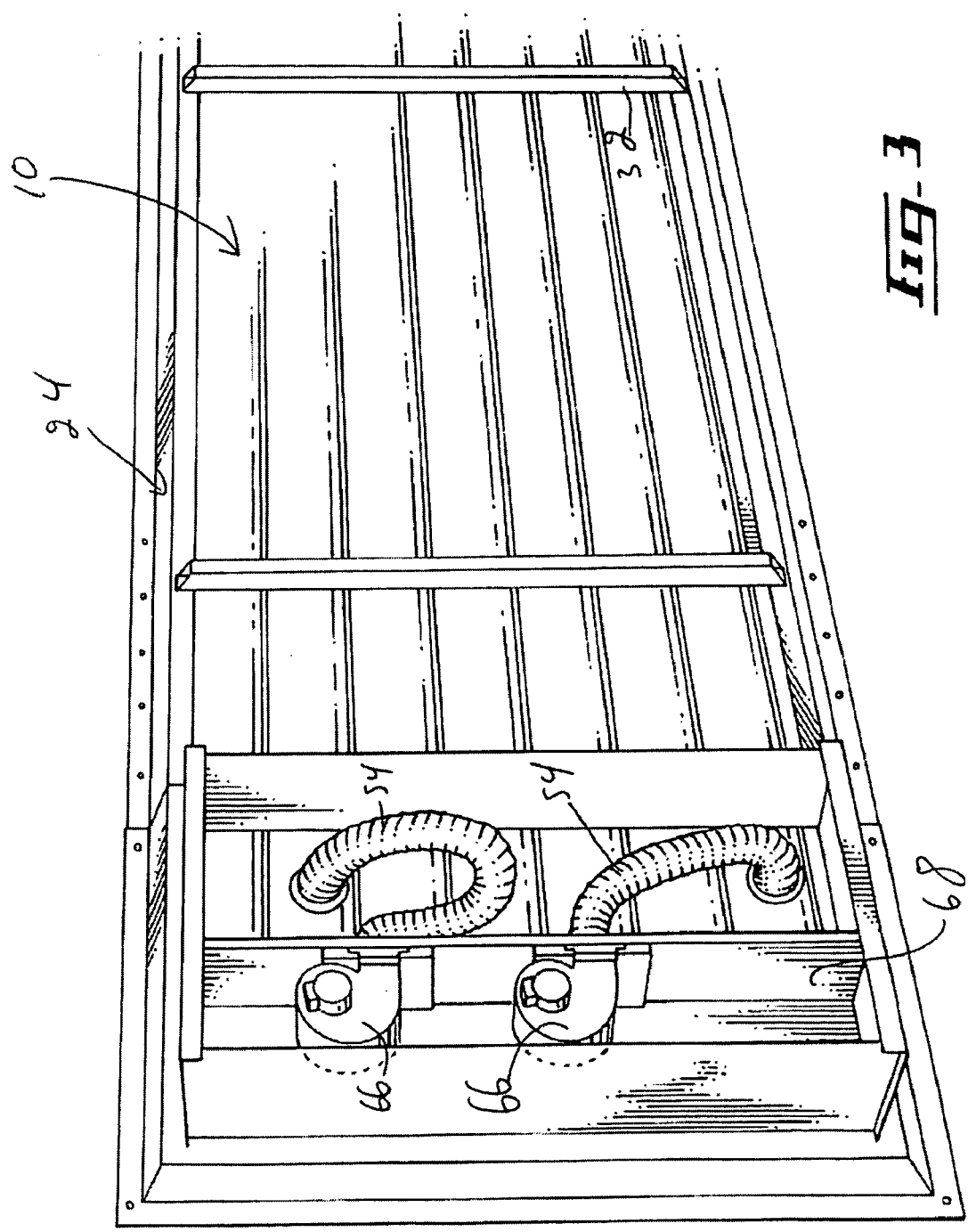
FIG. 3: in a partial perspective view with sections taken out, illustrates part of the inflating assembly used for insulating the insulating panel shown in FIGS. 1 and 2.

As mentioned previously, the pressurized air directed into the insulation panel 10 may be provided by any suitable source of pressurized air 61, such as for example an inflation system operatively coupled to the first and second groups of cells for selectively inflating substantially independently from each other the first and second groups of cells. FIG. 3 illustrates a situation wherein the pressurized air emanates from a pair of centrifugal-type ventilators or blowers 66. The pressurized air source such as the centrifugal-type blowers or ventilators 66 are typically protectively housed within a suitable housing chamber 68.

In some embodiments of the invention, the membrane structure 41 is divided into groups of cells 44, 46 and 48 each including a respective number of cells, the number of cells defining a substantially geometric progression. In these embodiments, there is an optimization in the number of blowers 58 and air ducts 54 required to produce frame-to-panel spacings 60 having various dimensions with a minimal number of blowers 58.

For example, the number of cells 44, 46 and 48 in each group of cells takes the form A×G^(n−1), with A a multiplicative factor, G an integer representing the basis in which the size of the frame-to-panel spacing 60 is measured (in number of cells) and n an integer varying from 1 to the number of groups. In some embodiments of the invention, A is equal to the number of layer of cells and G=2. The following specific example illustrates this case. Suppose that an insulating panel 10 includes two layers of cells separated into 3 groups. Taking A=2 and G=2, the first group includes two cells, one from each layer. The second group includes four cells, two from each group. The third group includes eight cells, four from each group. The cells within each group are adjacent to each other and divide the insulating panel into sections having a vertical extension that forms a substantially geometric progression. For example, inflating the third and first groups results in a panel extending over 4+1=5 "units" across the window aperture 12. Inflating the second and first group results in a panel extending over 2+1=3 "units" across the window aperture 12. This repartition of the number of cells in each group therefore allows to create frame-to-panel spacings 60 having any number of "units" in vertical extension. Since each group is either inflated or deflated, using 2 as a basis G allows to have any vertical extensions in units of 1 cell height for the panel 10 as this creates a mapping between the vertical extension of the panel expressed as a binary number and the cells to inflate. This may be useful for examples in embodiments wherein the frame-to-panel spacing is used to control a temperature of either one of the first and second environments 16 and 18 by allowing the flow of air between the first and second environments.

The pressurized air within the cells 44, 46 and 48 is able to flow between selected cells 44, 46 and 48 through corresponding the inter-cell apertures 70 which are located and configured so as to define the least two groups of cells including cells from the first and second layer cells that are, within each group of cells, in fluid communication with each other.

As illustrated more specifically in FIG. 9, the inter-cell apertures 70 are typically formed at the juncture or merging fold or line between cells 44, 46 and 48. Alternatively, the inter-cell apertures may be of the type indicated by the reference numeral 72 wherein the apertures are formed into said internal wall system 51 at locations substantially spaced apart from the first and second external walls 43 and 45 through the membrane defining the cells 44, 46 and 48. In situations wherein the cells 44, 46 and 48 are formed by welding or otherwise configuring membranes so as to form intersections therebetween, the inter-cell apertures 70 may result from discontinuations in the welding line 80.

Typically, the insulation panel 10 is manufactured by initially welding two films or sheets together about their respective peripheral edges. For example, in the embodiments shown in FIGS. 6 through 8, the external surfaces 43 and 45 of the insulation panel 10 are formed using first and second exterior sheets 74 an 76 adapted to be in contact respectively with the first and second environments 16, 18.

The internal wall system 51 includes Internal baffles 78 are typically formed using at least one so-called internal sheet. In the embodiments shown in FIGS. 6 and 7, the internal sheet is welded to the external sheets 74, 76 so as to form a substantially zigzag or W-shaped pattern. During the manufacturing process, a screen is used for preventing the welding together of the first and second sheets 74, 76. Similarly, the embodiments shown in FIGS. 8 and 9, include internal baffles 78 formed by using a pair of internal sheets 79 welded together and to the external sheets 74 76 using an internal screen. It should be understood that other manufacturing processes could be used without departing from the scope of the present invention.

The use of internal baffles 78 formed separately from the exterior shell, the exterior shell being formed by first and second exterior membranes 74 76 allows for the insulation panel 10 to preserve its structural integrity even in situations wherein internal baffles 78 are punctured or otherwise damaged. Alternatively, using tubes welded together instead of membranes or films could be used without departing from the scope on the present invention.

The reader skilled in the art will readily appreciate that while the insulating panel 10 is inflated using blowers 58 that are substantially continuously operating to maintain the insulating panel 10 inflated, it is within the scope of the invention to have insulating panels that are inflatable and subsequently sealable to minimize the need to continuously operate the blowers 58.

Although the present invention has been described hereinabove by way of preferred embodiments thereof, it can be modified, without departing from the spirit and nature of the subject invention as defined in the appended claims.

What is claimed is:

1. An insulating panel attachable to a building, the building defining a building aperture, the building aperture defining an aperture plane extending substantially thereacross, said insulating panel comprising:
    a membrane structure defining
        a first external wall and a substantially opposed second external wall;
        a peripheral wall extending between said first and second external walls, said first external wall, second external wall and peripheral wall together defining an enclosure; and
        an internal wall system located between said first and second external walls, said internal wall system being configured so as to divide said enclosure into a first cell located substantially adjacent to said first external wall and a second cell located substantially adjacent to said second external wall, said first and second cells being substantially spaced apart respectively from said second and first external walls by said internal wall system;
    said internal wall system being configured so as to divide said enclosure into a first layer of cells including at least two first layer cells and a second layer of cells including at least two second layer cells, said first layer cells being located substantially adjacent to said first external wall and said second layer cells being located substantially adjacent to said second external wall, said first and second layer cells being substantially spaced apart respectively from said second and first external walls by said internal wall system;
    said membrane structure defining inter-cell apertures extending between at least some substantially adjacent cells from said first and second layers of cells;
    said inter-cell apertures being located and configured so as to define at least two groups of cells including cells from said first and second layer cells that are, within each group of cells, in fluid communication with each other, said groups of cells being separated from each other by substantially fluid impervious wall sections of said internal wall system, said substantially fluid impervious wall sections substantially preventing an exchange of fluid between said groups of cells, said groups of cells including each a respective number of cells, said numbers of cells defining a substantially geometric progression; and
    a frame attachable to the building, said frame being operatively coupled to said membrane structure for maintaining said first external wall substantially parallel to said aperture plane and substantially in register with at least a portion of said building aperture when said frame is attached to said building.

2. An insulating panel as defined in claim 1, wherein at least one of said first and second layer cells is substantially tapered in a direction leading substantially away from a wall selected from said first and second external walls to which said at least one of said first and second layer cells is substantially adjacent.

3. An insulating panel as defined in claim 1, wherein at least a portion of said internal wall system is substantially reflective to infrared radiation.

4. An insulating panel as defined in claim 1, wherein said internal wall system includes a substantially zigzag shaped portion extending between said first and second structure external walls.

5. An insulating panel as defined in claim l, wherein said first and second layers of cells are substantially staggered relatively to each other.

6. An insulating panel as defined in claim 1, wherein said membrane structure defines at least one fluid inlet leading into one of said first and second cells, said fluid inlet being provided for receiving a pressurized fluid.

7. In combination with an insulating panel as defined in claim 1, an inflation system operatively coupled to said groups of cells for selectively inflating substantially independently from each other each of groups of cells.

8. An insulating panel as defined in claim l, wherein said internal wall system includes a membrane welded to said first and second external walls so as to form said first and second layer cells.

9. An insulating panel as defined in claim 8, wherein at least some of said inter-cell apertures are formed by substantially discontinuously welding said internal wall system to said first and second external walls.

10. An insulating panel as defined in claim 1, wherein at least some of said inter-cell apertures are formed into said internal wall system at locations substantially spaced apart from said first and second external walls.

11. An insulating panel as defined in claim 1, wherein said internal wall system is configured so as to divide said enclosure into a first layer of cells including at least two first layer cells, a second layer of cells including at least two second layer cells and a third layer of cells including at least one third layer cell, said first layer cells being located substantially adjacent to said first external wall, said second layer cells being located substantially adjacent to said second external wall and said third layer cells extending between said first and second layers of cells.

12. An insulating panel as defined in claim 11, wherein said first and second layers of cells are substantially staggered relatively to said third layer of cells.

13. An insulating panel as defined in claim 1, further comprising a meshed screen extending in a substantially parallel and adjacent relationship relatively to said first external wall.

14. An insulating panel as defined in claim 1, wherein the aperture plane is substantially vertical and said first and second layer cells are each substantially horizontally substantially elongated.

15. An insulating panel as defined in claim 14, wherein said frame includes a frame peripheral body located substantially adjacent said peripheral wall, said frame peripheral body defining a top body section, a bottom body section substantially opposed to said top body section and two frame lateral sections substantially opposed to each other extending between said top and bottom body sections, said frame further including a reinforcing member extending between said top and bottom body sections at a location substantially intermediate said two lateral frame sections.

* * * * *